Figure 3:
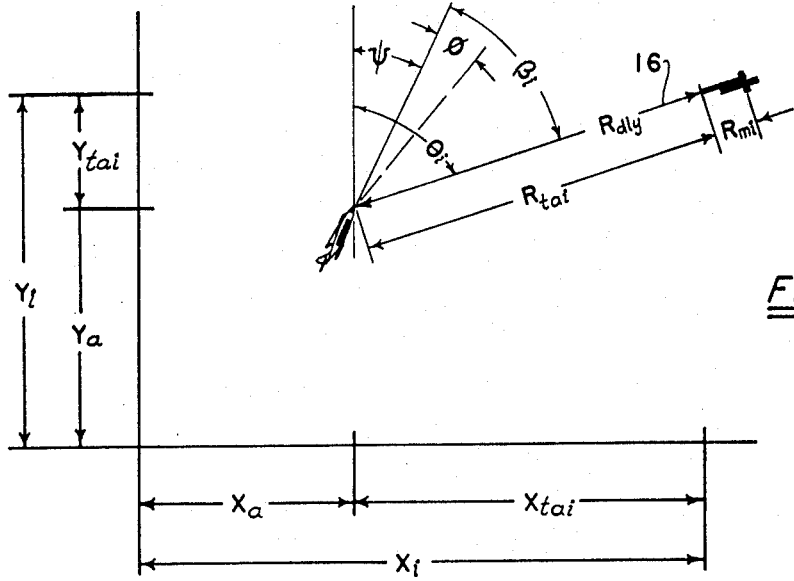

United States Patent

[11] 3,571,479

[72] Inventors Chris G. Horattas
 Stow;
 Richard A. Hujar, Munroe Falls, Ohio
[21] Appl. No. 837,608
[22] Filed June 30, 1969
[45] Patented Mar. 16, 1971
[73] Assignee Goodyear Aerospace Corporation
 Akron, Ohio

[54] DIGITAL ELECTRONIC RADAR TARGET GENERATOR
 7 Claims, 6 Drawing Figs.
[52] U.S. Cl. ................................................... 35/10.4,
 343/5
[51] Int. Cl. ..................................................... G09b 9/00
[50] Field of Search ........................................... 343/5 (DP);
 35/10.4

[56] References Cited
UNITED STATES PATENTS
3,159,705 12/1964 Rhodes et al. ................ 35/10.4
3,445,577 5/1969 Sperling et al. ................ 35/10.4

Primary Examiner—Rodney D. Bennett, Jr.
Assistant Examiner—Malcolm F. Hubler
Attorney—J. G. Pere ABSTRACT: Digitized radar targets are stored in a memory matrix where range is "bit" oriented and azimuth is "word" oriented. Each word in the matrix represents an azimuth line segment of a target on a radar display and the bit position within a matrix word represents the target range, each bit being the smallest range unit defined by the resolution of the display. A computer identifies the location of all targets in the display matrix and transfers the data to parallel-to-serial shift registers which output serial pulse trains representative of the target words. Summing of the shift register outputs results in a signal having analog characteristics and capable of use in a simulator visual display.

Patented March 16, 1971
3,571,479
2 Sheets-Sheet 1
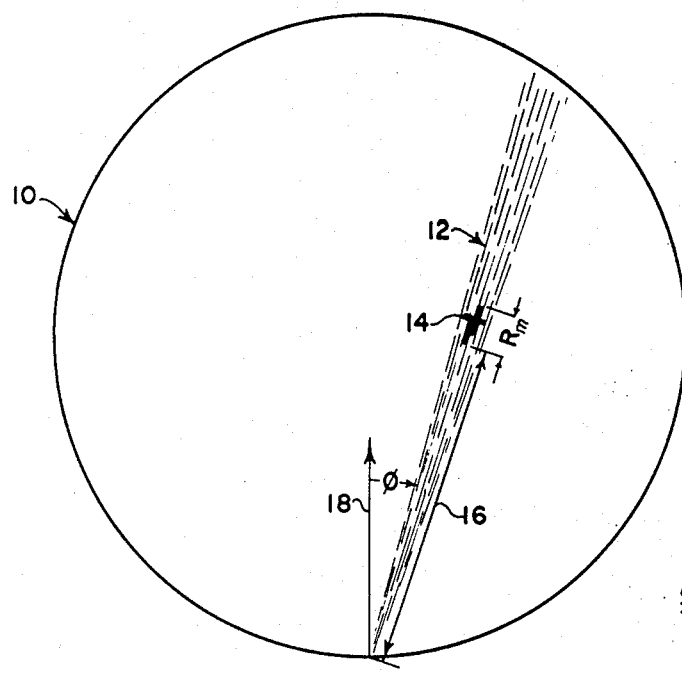
FIG.-1
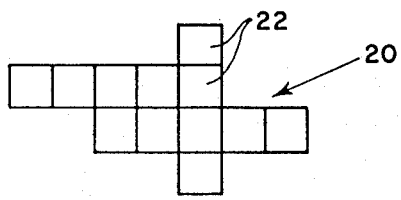
FIG.-2A
| ADDRESS | BITS |   |   |   |   |   |   |   |   |   |
|---------|------|---|---|---|---|---|---|---|---|---|
| N       | 0 | 0 | 0 | 0 | 0 | 1 | 0 | 0 | 0 | 0 |
| N+1     | 0 | 1 | 1 | 1 | 1 | 1 | 0 | 0 | 0 | 0 |
| N+2     | 0 | 0 | 0 | 1 | 1 | 1 | 1 | 1 | 0 | 0 |
| N+3     | 0 | 0 | 0 | 0 | 0 | 1 | 0 | 0 | 0 | 0 |
| N+4     | 0 | 0 | 0 | 0 | 0 | 0 | 0 | 0 | 0 | 0 |
FIG.-2B
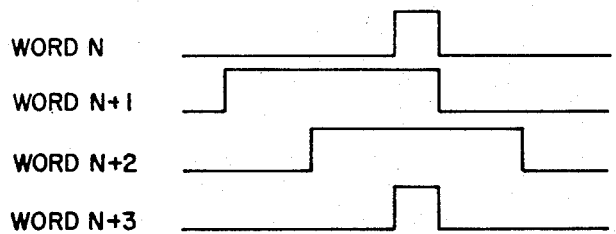
FIG.-2C
INVENTORS
CHRIS G. HORATTAS
RICHARD A. HUJAR
BY:
L.H. Germain
AGENT

INVENTORS
CHRIS G. HORATTAS
RICHARD A. HUJAR

BY:
L.A. Germain
AGENT

DIGITAL ELECTRONIC RADAR TARGET GENERATOR

This invention relates generally to simulators displaying radar returns and in particular to a target generator which superimposes video images representative of radar target returns on a radar simulator display.

Because the signals required by an operational radar are analogue in nature, present simulator systems follow an analogue approach to radar return simulation. This method is satisfactory for far ranges and for a limited number of targets, but it is very unstable on expanded display scales, being susceptible to noise and drift, and further, requires separate circuitry for each fixed target.

The present invention is an advancement in the state of the art, providing means to generate radar target returns which can be processed by a digital computer, stored for any length of time, modified at will, and offers resolution and stability heretofore unrealized in simulator systems.

Although the required radar signals are analogue in nature, they can be formed by a series of pulses of varying amplitudes and pulse widths representing segments of an image. Therefore, an object of this invention is to provide means applying digital techniques to generate radar video returns which can be superimposed on a radar simulator display.

Figure 4:
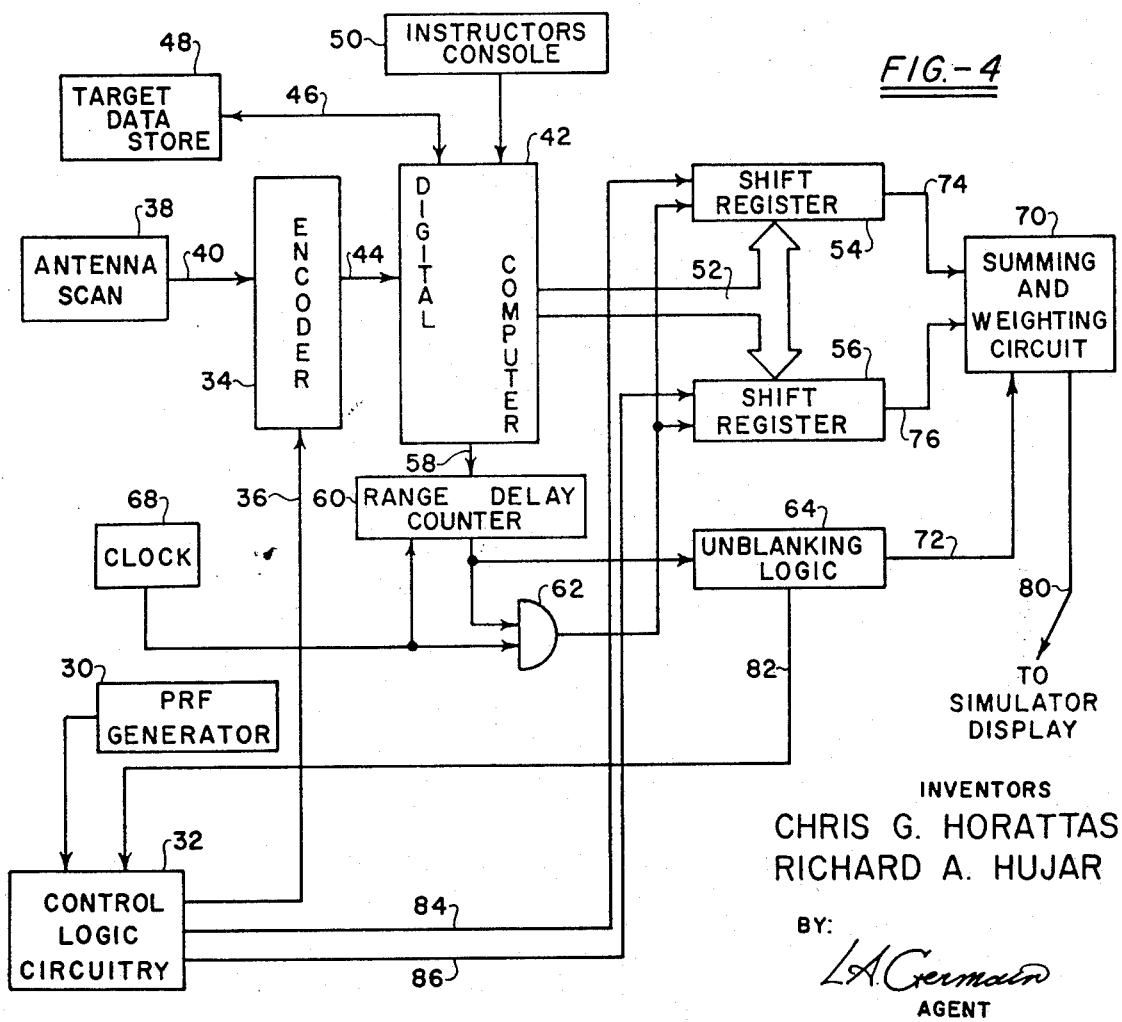

Other objects and advantages of the invention will become apparent and readily understood from the following description of the preferred embodiment and the accompanying drawings wherein:

FIG. 1 illustrates a radar scope display showing a target as generated by the apparatus of the invention;

FIGS. 2A—2C illustrate the bit-word representation of a target;

FIG. 3 is a graphical representation of the target coordinate transformation; and FIG. 4 is a diagrammatic representation of the apparatus for generating a simulated radar target display.

With reference to FIG. 1, an operational radar scope display is generally indicated at 10 with a number of azimuthal scan lines 12 and a typically generated target 14. The range 16 to the target 14 is measured along the lines 12, and the antenna azimuth is the angle $\Phi$ with reference to aircraft heading 18. Any number of complex target geometries may be generated and displayed by the apparatus of the invention, however, for the purposes of this description a simple target, having the shape illustrated in FIG. 2A, will be used for illustration.

The target 20 of FIG. 2A is divided into a number of bit elements 22 which describe the shape of the target and the number of bits used will depend on the complexity of the target geometry, the resolution of the display desired, and the bit storage available. Each target is bit-word orientated in a computer matrix 24 as illustrated in FIG. 2B where each bit 22 describing a target or portion thereof, is represented by a binary 1 within a computer word 26. Each word 26 is the matrix represents an azimuth line segment on the radar display 10, and each bit within a computer word represents the target range. The number of consecutive computer words 26 comprising a target matrix will depend on the number of azimuth line segments 12, the number of intensity levels required, the maximum range required, and the resolution of the display. Each computer word 26 is converted into a pulse train wherein a pulse appears wherever a binary 1 appears in a word as illustrated in FIG. 2 of the drawing where the bit pattern of memory word address n in FIG. 2B will result in the word n pulse train of FIG. 2C. Each of the matrix words 26 will appear on the radar display as a single sweep and the segments of the sweep which correspond to a binary 1 will appear bright. Since a binary "bit" has only two possible states, only two levels of intensity are realized, but by providing additional words for each sweep, multiple levels of intensity are provided.

The major function of the invention is performed by a digital computer. Targets are entered into computer as X and Y coordinates and intensity level, and may be stored on perforated tape, magnetic tape, or on any other of the digital storage mediums customarily used for this purpose. A set of coordinates and an intensity number are entered for each target "bit," and having the aircraft initial position with respect to an origin also entered, the computer program performs a coordinate transformation on each target bit. The transformation is necessary to establish the range of each target bit and its azimuth with respect to the aircraft heading angle. The transformation operation is illustrated in FIG. 3 where the following are appropriate.

Given: $(X_i, Y_i)$ and $(X_a, Y_a)$

Where:

$X_i, Y_i$ = target coordinates and $i$ = target 1, 2, 3 . . . n and $X_a, Y_a$ = aircraft coordinates.

Compute: $X_{tai} = X_i - X_a$

Where:

$X_{tai}, Y_{tai}$ = coordinates of target with respect to aircraft.

$R_{tai} = [(X_{tai})^2 + (Y_{tai})^2]^{1/2}$; $R_{tai}$ = target range i $$O_i = \tan^{-1} \frac{X_{tai}}{Y_{tai}}$$

$\beta_i = \theta_i - \psi$
$\psi$ = aircraft heading angle.
$\beta_i$ = target azimuth angle$_i$ The quantities $R_{tai}$, $\theta_i$, and $\beta_i$ are continuously updated for each target to provide realism of motion and direction to the display. These quantities are used in the computation to establish a range $R_{mi}$, which is range quantized and stored in the memory matrix. Quantizing establishes the position of each bit 22 within a computer word 26. $R_{mi}$ is the difference between $R_{tai}$ (range from aircraft to target) and $R_{dlu}$ (range delay). $R_{dlu}$ is the value of range to a minimum range target and is continuously updated by the computer program.

The azimuth angle $\theta i$, , less the aircraft heading angle $\Psi$, is the target azimuth angle $\beta i$ which is quantized and used to establish the address within the memory matrix where a particular bit 22 is located.

The geometry of a plurality of complex targets which may be displayed remains geographically fixed as defined by their X and Y coordinates. By processing the target data digitally the system preserves the relative geographical location of each target bit with respect to each other bit within the memory matrix. The invention therefore provides a properly orientated target display no matter what the aircraft heading is relative to the target. Target position stability as presented on an expanded display scale is enhanced by the timing and synchronization system as hereafter discussed with reference to FIG. 4.

FIG. 4 illustrates the system block diagram for generating the target signals of this invention. A PRF (pulse-repetition-frequency) generator 30 initiates a start pulse to control logic circuitry 32 which sends an interrogate pulse to an encoder 34 via line 36. The PRF generator 30 is a periodic clock oscillator adjusted to generate a pulse coincident with the initiation of a radar sweep and occurs in synchronization with the radar antenna energy radiation as provided by a simulated antenna scan 38. The antenna scan 38 is coupled to the encoder 34 via line 40 which converts the angular information into a binary word equivalent to the azimuth and this provides the radar look angle $\Phi$ shown in FIG. 3.

A computer 42 is provided which is a parallel type digital data processor capable of handling at least a two microsecond instruction cycle. The instruction cycle is determined by the number of computations which must be completed between successive sweeps of the radar. The look-up time and the interface time between computer 42 and shift registers 54 and 56 must also be considered, for two or more matrix words 26 are outputed between each sweep of the radar to obtain the multiple intensity levels herebefore mentioned. Updating of the target elements 22 in the matrix words 26 using the transformation and quantizing computations herebefore described, is performed at a slower iterative cycle than interface rate governed by the sweep frequency. General purpose computers having instruction cycle times of two microseconds and interface times of eight microseconds are available in the art.

A binary word equivalent to the azimuth is transferred on line 44 to computer 42 which also receives target information on line 46 from a target data store 48. The data store 48 may be any of the digital storage means available and compatible with the computer used and which provides the target information as described with reference to FIG. 1 and 2A—2C. Also included as an input to the computer 42 is an instructor's console 50 which provides a means to add additional target information or new targets not already provided for in data store 48.

The binary word equal to the azimuth provided to the computer 42 on line 44 may be, for example, 001 101 110 111 000, and the equivalent computer address 015670 is a word which contains the target data supplied by the target data store 48. This word provides target location information and two levels of signal intensity inherent in a binary signal. The computer 42 therefore, identifies the location of the targets in matrix. Since two matrix words may be used for location identification and provide additional target intensity levels, the additional binary word providing the intensity information will be 001 101 110 111 001 and its equivalent computer address 015671. The two matrix words which identify target location and intensity are outputted simultaneously by computer 42 on line 52, parallel-by-bit and sequentially-by-word, to two shift registers 54 and 56.

For each cycle and prior to the PRF pulse, the computer 42 outputs a range delay word of data on line 58 to a range delay counter 60 giving the least range of a target 14 to the aircraft as illustrated by 16 in FIG. 1 and FIG. 3.

The memory matrix which is comprised of the digitized radar targets encompasses a relatively small geographic area in comparison to relatively larger areas encompassed by existing radar systems. In order to locate the digitized target at radar ranges greater than the maximum capable range of the target bits within the matrix, the initiation of the output pulse train is time delayed to coincide with the time equivalent of range delay. The range delay $R_{dly}$ is the value of range to the minimum range target and is continuously updated.

Also, and at the initiation of the PRF pulse, a clock 68, which is a free running multivibrator generating the frequency of shifting the data in registers 54 and 56 and establishing the range delay, is turned on. The range delay is counted down until a zero is contained in the counter 60, at which time an unblanking logic gate 64 is started enabling a shift pulse to the two shift registers 54 and 56 from the clock 68 via gate 62 and also enabling a summing-weighting circuit 70 via line 72.

The shift registers 54 and 56, upon receiving the shift pulse from gate 62, shift the digital target data stored there and wherever a binary bit 1 appears in a matrix word, a pulse will be generated at their respective outputs 74 and 76 as illustrated in FIG. 2c. The shift register outputs 74 and 76 are combined in a summing-weighting circuit 70 which outputs on line 80, a single composite pulse train. The summing and weighting device 70 weights output 74 twice the value of output signal 76 and thus the single pulse train on line 80 contains four distinct amplitude levels which define four levels of intensity of a target. The output 80 of summing-weighting circuit 70 is now in a form representative of an analogue signal which can be utilized by and superimposed on the radar scope display of a simulator system (not shown in the FIG.).

When the last shift pulse occurs in the shift registers 54 and 56, the unblanking logic gate 64 inhibits gate 62 and sends a feedback signal 82 to the control logic 32 to reset the registers via lines 84 and 86 in preparation for the next PRF pulse.

It is considered that the above description is sufficient to enable persons skilled in the art to practice the invention, and that it is deemed unnecessary to show and describe in detail, the various logic circuits represented by blocks in the diagram of FIG. 4. Any number of equivalent devices capable of performing the functions indicated will be suggested to one skilled in the art, and the specific device selected will depend on the computer available and the resolution and stability desired.

There is thus provided a radar target generator which can simulate radar target video returns characterized by target detail and processing flexibility heretofore unknown in the art, and while the invention has been particularly shown and described with reference to the preferred embodiment, other means and changes may occur to one skilled in the art without departing from the spirit of the invention.

We claim:

1. In a radar target generator for simulators having a visual display, the combination comprising:
   a. target storage means wherein range and azimuth are bit-word oriented in a digital matrix and providing an output indicative of target location and intensity;
   b. encoder means providing a digital output equivalent to a radar look angle;
   c. computer means coupled to and accepting the target and encoder means outputs to perform a coordinate transformation on each target and to output a signal identifying the location of all said targets;
   d. converter means coupled to the computer means output to provide a serial pulse train signal at its output;
   e. logic circuit means coupled to the encoder, computer, and converter means to provide timing synchronization of said means; and
   f. modifying means coupled to the converter means to provide summing, weighting, and amplification of the pulse train signal and outputting a signal having analogue characteristics and capable of use in a simulator visual display.

2. The target generator of claim 1 wherein targets are stored range-by-bit and azimuth-by-word in a digital matrix with a binary bit 1 describing a target element within a matrix word and the summation of matrix words describing a complete target.

3. The target generator of claim 2 wherein an additional word is stored in the matrix for each azimuth providing at least four levels of signal intensity.

4. The target generator of claim 1 wherein the converter means comprises at least two parallel-to-serial shift registers accepting the computer means output parallel-by-bit and serial-by-word and outputting a pulse whenever a binary bit 1 appears in a matrix word.

5. The target generator of claim 1 including means to provide additional target data to the computer means.

6. The target generator of claim 1 wherein the logic circuit means comprises:
   a. a PRF generator providing a start pulse at predetermined time intervals;
   b. control logic circuit means coupled to and accepting the start pulse from the PRF generator to provide an interrogate pulse to the encoder means and a start pulse to the converter means;
   c. counter means coupled to the computer means and accepting a range delay word from said computer means to count down the least range to a target word;
   d. a free running multivibrator clock coupled to the counter means and the converter means to provide a shift frequency to said means; and
   e. an unblanking logic circuit means coupled to the counter, control, and modifying means to provide a time gate during which pulses from the converter means appear at the modifying means and providing a feedback signal to the control means to reset all circuits in preparation for a new PRF signal.

7. A method of synthesizing a programmable radar signal for simulation of target displays comprising the steps of:

a. storing a digitized target range by bit and azimuth by word wherein a binary bit 1 represents the smallest unit defining a target or portion thereof;
b. providing a digital equivalent of an antenna angular position;
c. combining the digitized target and antenna position information to provide a signal indicative of target location and intensity;
d. converting the signal identifying said targets into a serial pulse train wherein a pulse appears where a binary bit 1 appears in an azimuth word;
e. summing all pulse train signals to provide a signal having at least four levels of intensity; and
f. amplifying the summed pulse train signals to provide an analogue representation for visual display.